March 9, 1943.  O. KRENKE  2,313,557
HOSE REEL
Filed Oct. 5, 1940
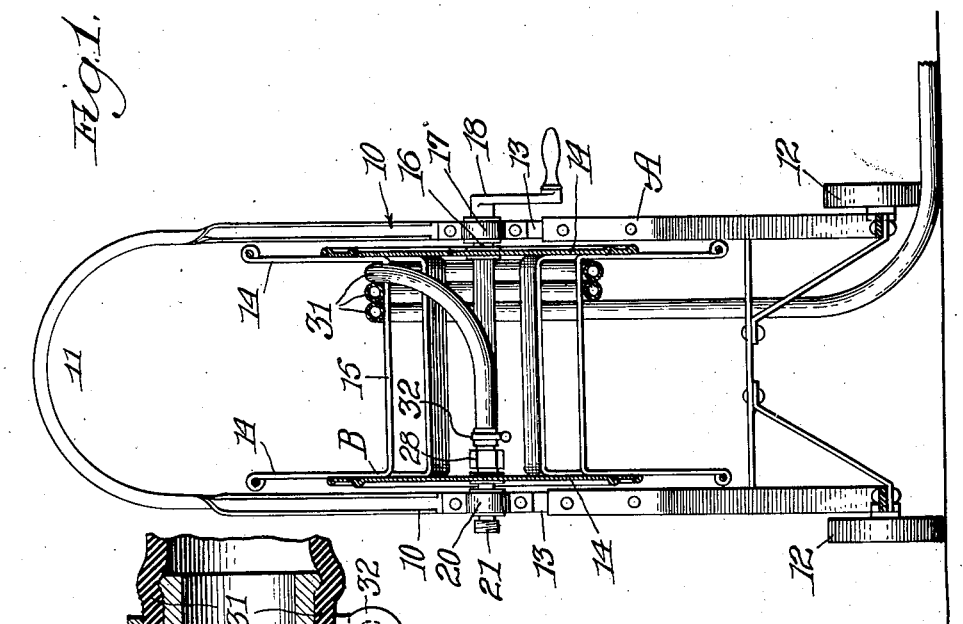
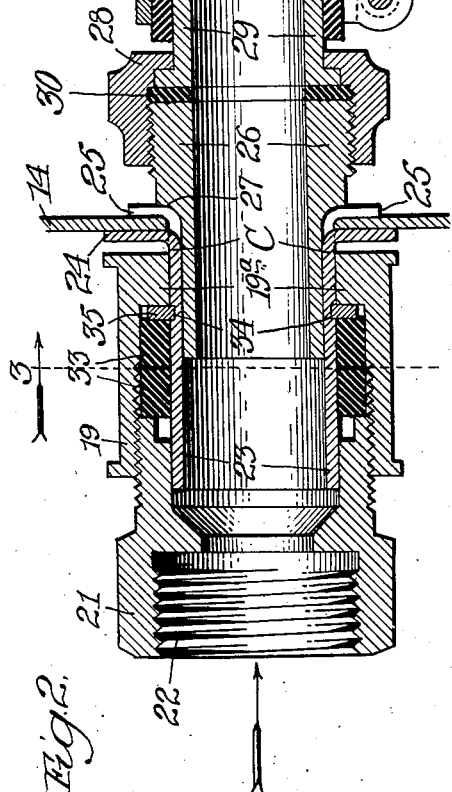
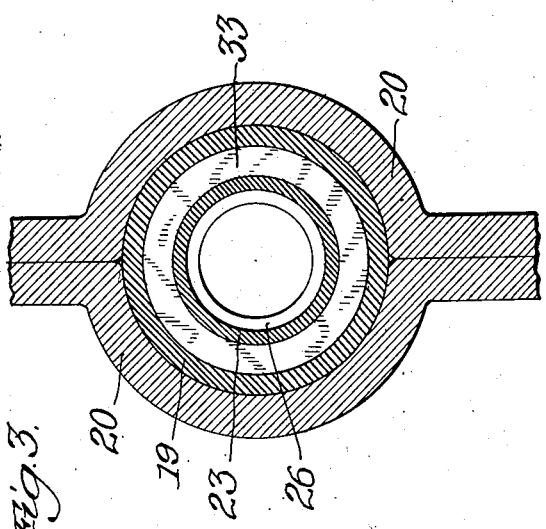
Inventor:
Otto Krenke,
By Chritton, Wiles, Davies, Hirsch & Dawson,
Attys.

Patented Mar. 9, 1943

2,313,557

UNITED STATES PATENT OFFICE 2,313,557

HOSE REEL

Otto Krenke, Port Huron, Mich., assignor to Anker-Holth Manufacturing Company, Inc., Port Huron, Mich., a corporation of Michigan Application October 5, 1940, Serial No. 359,970

2 Claims. (Cl. 299—78)

This invention relates to a hose reel and the like.

An object of the invention is to provide a hose reel which may be portable or easily supported in position adjacent the faucet and wherein a secure connection between the tube leading from the faucet and the hollow journal of the hose reel will be maintained, the hose being supported on the reel so that any desired length may be withdrawn without interfering with the flow of water therethrough. A further object is to provide in a hose reel wherein the flow of water passes through a journal upon which a rotatable drum is mounted, improved means for providing a permanent liquid-tight revolving joint. Other specific objects and advantages will appear as the specification proceeds.

The invention is illustrated in a preferred embodiment, by the accompanying drawing, in which—

Figure 1 is a vertical sectional view of a hose reel embodying my invention; Fig. 2, a longitudinal sectional view of the journal and stuffing box connections through which the water may flow from the faucet and into the hose upon the drum; and Fig. 3, a transverse sectional view, the section being taken as indicated at line 3 of Fig. 2.

In the illustration given, A designates a frame; B, a drum rotatably mounted therein; and C, a liquid-tight joint upon which one end of the drum rotates.

The frame A may be of any suitable construction. In the illustration given, it consists of a metal frame 10 affording an upper handle 11 and supporting at its lower side wheels 12 upon which the frame may be conveniently moved. Vertical standards 13 of the frame support the drum B in rotatable position. The drum B is provided with side disks 14 and with an inner open frame 15 upon which the hose may be wound. At one side, the drum is provided with a shaft 16 passing through a bearing 17 provided by the vertical standard 13. A crank 18 is secured to the end of the shaft 16 and employed for rotating the drum. At its other end, the drum B is rotatably supported by the apparatus C, which will be described now in greater detail.

The apparatus C is provided with a stuffing box 19 supported within the bearing 20 of the frame. The stuffing box 19 is designed to be stationary and is threadedly equipped at its rear with a connection member 21 provided with internal threads 22. If desired, the member 21 may be provided with external threads to receive the appropriate connection carried by a short-length hose. Usually, a short length of hose is employed to connect the member 21 to a nearby faucet.

Received within the stuffing box 19 and designed to rotate therein is a journal member 23 which is hollow and designed to permit the flow of water therethrough. It will be noted that the journal 23 is provided on its inner side with an upturned flange 24 against which the side disk 14 of the drum rests. The opposite side of the disk 14 is engaged by a vertical flange 25. Pressed within the journal member 23 is an inner fitting 26 which is provided with a shoulder 27 engaging the member 25. As shown more clearly in Fig. 2, the vertical flange 25 comprises a plurality of fingers struck from the journal member 23 and turned outwardly against the member 14. The inner flange 24 likewise consists of a number of fingers struck from the member 23 and turned outwardly against the opposite side of member 14. The member 26 has its inner portion pressed within the journal 23, the friction fit being sufficient to hold it securely within member 23. Other means, such as welding or soldering, may be used to secure member 26 to journal 23. The outer edge portion of the member 26 is threaded to receive a lock nut 28. A connection 29 is locked against a gasket 30 by a depending flange of the lock nut 28. Upon the member 28 is secured the end of the flexible hose 31 by means of a clamp 32 of well-known construction. Interposed between the stuffing box 19 and the journal 23 are rings of packing 33.

As shown more clearly in Fig. 2, the journal member 23 is provided with an annular groove 34, and a locking ring 35 engages the groove and extends upwardly within the packing box 19 and in engagement with the rear flange 19ª thereof, thus preventing the journal from slipping inwardly from the stuffing box or the stuffing box from slipping outwardly toward the end of the journal member 23. It is thus impossible for the parts to slip apart during rotation and produce a leaky joint.

In the operation of the apparatus, the connection 21 is united with a hose connection leading to a faucet or other source of waterflow. Water may thus flow directly through the journal 23, fitting 26, connection fitting 29, and the hose 31.

A short length of hose may be withdrawn by rotation of the drum and the reeling or unreeling of the hose does not affect the flowing of the water. The drum may be rotated to increase the length of the hose while the water is still flowing. Likewise, when it is desired to replace the hose upon the drum, this may be done after the water is closed off or even while the water is flowing. During the rotation of the drum, the journal and packing box are kept in their original relative positions by the locking ring 35, there being no tendency for the hollow journal to work out of the stuffing box and away from the packing.

While in the foregoing description, I have set forth certain structure as illustrative of one method or means by which the invention can be employed, it will be understood that the products may be reversed when desired to secure the same results and a great variety of modifications may be made without departing from the spirit of the invention.

I claim:

1. A coupler adapted for use with a rotatable hose drum, comprising a cylindrical journal having an annular groove in the intermediate portion of its outer periphery, a fitting pressed within said journal and providing a tight friction fit therewith, said fitting being formed for connection with the end of a hose carried by said drum, a pair of members including a stuffing box member and an attachment fitting received about said journal, said members being threadedly engaged and providing a stuffing box rotatable about said journal and a depending shoulder at the forward end of said stuffing box, stuffing within said stuffing box, a locking ring received within said groove and extending upwardly with one face thereof abutting said shoulder and the other face abutting said stuffing to hold the journal against axial movement relative to said shoulder while permitting relative rotation thereof, a plurality of radially-disposed fingers integral with said journal and extending laterally outwardly from one end of said journal, a group of said fingers being spaced longitudinally from the remainder of said plurality of said fingers, the longitudinally-spaced groups of fingers being adapted to receive therebetween a wall of the hose drum in interlocking relation, and means for securing the end of a hose to said attachment fitting.

2. A coupler adapted for use with a rotatable hose drum, comprising a cylindrical journal of thin tubular metal having one end thereof cut to form a plurality of integral outwardly-turned radially-disposed fingers, a group of said fingers being longitudinally spaced from the remainder of said fingers, said longitudinally-spaced fingers being adapted to receive therebetween in interlocking engagement the wall of a hose drum, a sleeve member having a tubular portion pressed within said journal and engaging the same in a tight frictional fit, a shoulder on said sleeve member for engaging and supporting said group of fingers, a tubular fitting supported for connection with the end of said sleeve member and adapted to receive the end of a hose carried by said drum, coupling means for releasably securing said sleeve member to said tubular fitting, a pair of threadedly-connected members rotatable about said journal and providing with said journal a stuffing box, one of said members providing an attachment for a hose, said members providing a shoulder at the forward end of said box, packing received within said box, said journal being provided at an intermediate portion of the outer periphery thereof with an annular groove disposed adjacent said shoulder, and a ring member pressed against the groove of said journal and extending outwardly between the shoulder of the stuffing box and the packing to prevent longitudinal movement of the journal with respect to the shoulder while permitting relative rotation thereof.

OTTO KRENKE.